Patented Nov. 19, 1929

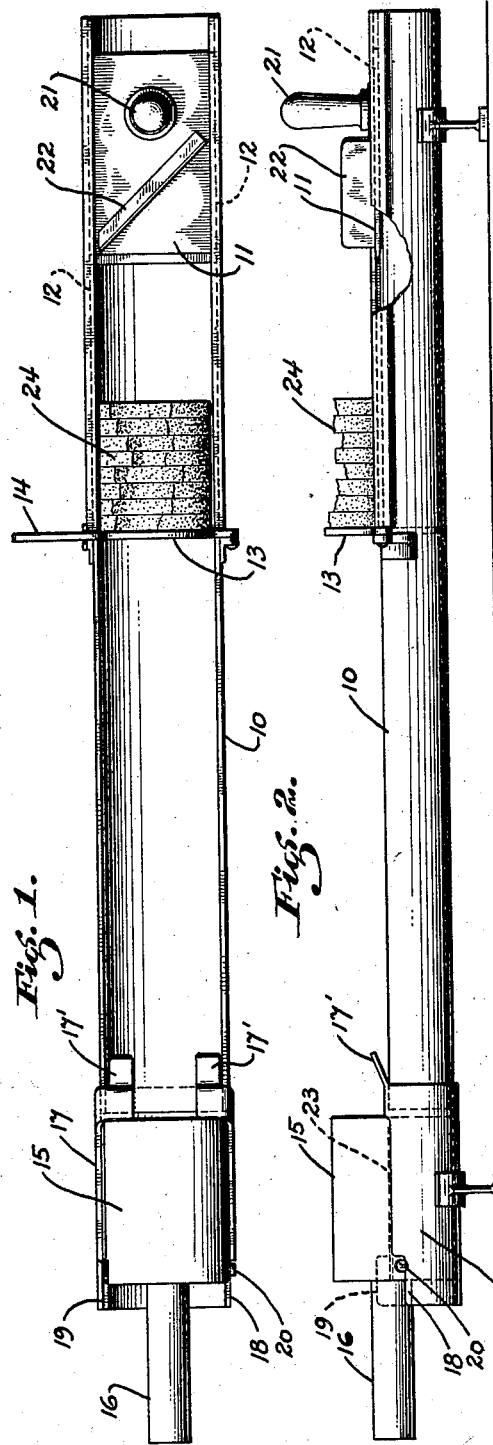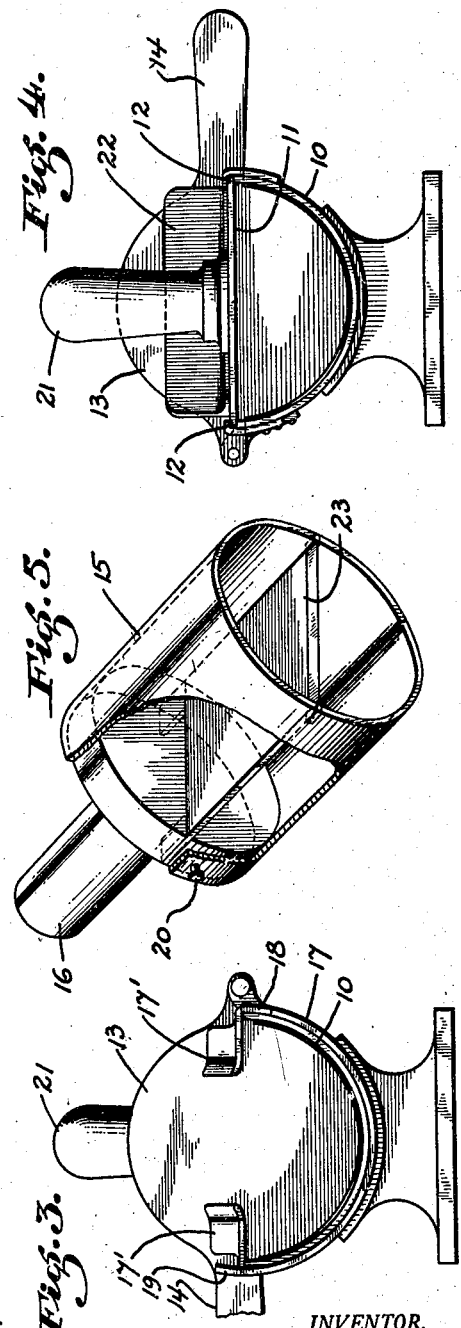

1,736,257

UNITED STATES PATENT OFFICE

OWEN T. DOUGLASS, OF KALAHEO, TERRITORY OF HAWAII

CANNING APPARATUS

Application filed December 3, 1928. Serial No. 323,521.

My present invention relates to canning apparatus and more particularly to a device for halving and canning previously sliced fruits.

The primary object of my invention is to provide apparatus for the recovery of half slices of damaged full slices of fruit and the like.

A further object is to provide apparatus whereby the retained half slices of fruit may be conveniently packed in a can in a uniform manner.

Additional objects and advantages of my invention will be evident to those skilled in the art and others will be pointed out as the description proceeds.

For a better understanding of my invention, reference should be had to the accompanying drawing, wherein I have shown by way of illustration and not of limitation a preferred embodiment of my invention.

In this drawing—

Figure 1 is a plan view of my improved apparatus,

Figure 2 is a side elevation of the apparatus shown in Figure 1,

Figure 3 is an enlarged end view of the discharge end of my apparatus with a portion thereof removed, Figure 4 is a view similar to Figure 3 taken from the opposite end of my apparatus, and Figure 5 is a perspective view of a part of my apparatus with a portion broken away to expose the interior construction thereof.

In the canning of fruits and the like, and particularly in the canning of pineapples wherein the fruit is canned in complete slices, it often happens that some of the slices will become damaged to such an extent that they cannot be used. These damaged slices have heretofore been laid aside and diced or crushed to be sold as such in separate containers. It often happens that these damaged slices are substantially perfect except for a small portion along one side thereof and in order to salvage the remaining perfect portions of these damaged slices, I propose to cut away the damaged halves of the slices in such a manner that two perfect half slices will, when placed together, produce a complete perfect slice, the only difference being that the complete slice so produced will be cut in half. The slices, however, provided in this manner will be of considerably more value to the canner than would be the case if the complete damaged slices were diced or crushed as is now the present practice and I therefore, by my invention, provide a means whereby the undamaged portions of sliced pineapple may be recovered in the canning operation.

As illustrated in Figures 1 and 2, my complete apparatus contemplates a horizontally extending trough 10, in the present instance having a semi-cylindrical shape. At one end of the trough 10 I provide a knife 11 which is slidably mounted upon the trough so as to operate in a horizontal plane by means of grooved flange members 12. These grooved flange members extend substantially one-half the length of the trough 10 and permit the knife 11 to be moved axially along the top surface of the trough so that it will, when moved to the left, cut away the projecting upper portions of any fruit or the like placed in the trough, as will hereinafter appear.

At a point intermediate the ends of the trough 10 and at the inner ends of the grooved flange members 12 I provide a stop or gate 13. This gate is hinged to one of the upper edges of the trough 10 and its purpose is to hold the fruit against sliding in the trough when it is being cut by the knife 11. A handle 14 is provided upon the gate 13 so that it can be turned upwardly into an inoperative position and permit a deliberate sliding of the fruit after it is cut by the knife 11 toward the discharge end of the trough. At the discharge end of the trough I show a removable receptacle 15 which is adapted to receive the fruit and facilitate its transportation to its final container. This receptacle 15 is provided with a handle 16 by means of which it can be conveniently handled and otherwise operated and it has an internal diameter substantially the same as the breadth of the trough 10 so that when properly located it will function as a continuation thereof.

In order to properly support the receptacle 15, I provide an enlarged portion 17 rigidly mounted upon the end of the trough 10 so that when the receptacle is laid therein it will assume a position in alignment with and adjacent the discharge end of the trough 10. This enlarged portion 17 is provided with flared ears 17' which extend inwardly over the top of the trough 10 immediately in front of the receptacle 15 and serve, in conjunction with a feature of the receptacle 15 which is to be hereinafter more fully described, to guide the half slices of fruit into the receptacle 15 with their upper and straight edges horizontal so that when the receptacle 15 has received a charge of half slices sufficient to fill it lengthwise, the halves will be arranged therein with their upper or straight edges arranged uniformly in the same plane.

In connection with these two figures of the drawing, attention is also directed to the fact that the enlarged portion 17 is provided with diametrically disposed stops or surfaces 18 and 19 upon the edges thereof. These stops 18 and 19 cooperate with a pin or boss 20 upon the member 15 and serve to properly locate the receptacle 15 upon the enlarged portion 17 as will be pointed out more fully hereinafter.

By referring to Figures 3 and 4 of the drawing, it will be seen that the body of the gate 13 has the shape of a disk and that its lower half projects downwardly into the trough 10 so as to substantially close the same. It will also be noted in connection with Figure 4 that the knife 11 is provided with an upwardly projecting handle 21 by means of which it may be readily moved in the cutting operation. This figure of the drawing also shows the knife 11 as having a diagonally disposed guard or plow member 22. The function of this guard or plow 22 is for the purpose of pushing away and discharging over the side of the trough 10 the upper or mutilated halves of the slices of fruit as they are cut away.

By referring now to Figure 5, it will be seen that the receptacle 15 is provided with a diametrically extending partition 23. This partition is so located within the receptacle 15 with respect to the pin or boss 20 that it will assume a horizontal position with respect to the trough 10 when the boss 20 is brought into engagement with either of the previously referred to stops 18 or 19. From this figure of the drawing, it will be seen that the stop 20 is in this instance arranged to one side of the partition 23 and this fact explains the reason for the stops 18 and 19 being respectively lowered and raised with respect to the top plane of the trough 10. If this boss 20 were placed in the same plane with the partition 23, the stops 18 and 19 would then be arranged in the same horizontal plane as this difference in their heights would then be unnecessary.

The operation of this embodiment of my invention is as follows: It will be assumed that the operator has accumulated a quantity of damaged slices of pineapple or the like, the perfect halves of which he wishes to salvage. He will first place the slices, designated by the numeral 24 in the drawing, edgewise within the trough 20 against the right hand side of the gate 13 with the damaged portions uppermost, as illustrated. He can then, by sliding the knife 11 to the left, cut away the damaged portions and leave perfect half portions in the trough. The gate 13 can then be opened and the remaining half slices pushed over toward the receptacle 15. If the receptacle 15 is in its proper position upon the support 17, the slices can be pushed completely into the receptacle until there is a sufficient number therein to completely fill the lower half thereof. After the lower half of the receptacle 15 is filled in this manner with half slices it can be turned by the handle 16 so as to bring the now empty upper half thereof into alignment with the trough 10 so that this remaining half of the receptacle can be filled in the same manner.

After the receptacle 15 is thus completely filled, it may be removed from the support 17 for the purpose of discharging its contents into the final or shipping containers, such as is now common practice. In connection with this phase of my invention it is pointed out that the receptacle 15 contemplated by me is of such dimensions that it may be inserted together with its contents into the final container.

In carrying out this final operation of placing the half slices in their final receptacle, I have found that this can best be done by holding the receptacle in a vertical position while the final container is placed thereover and then, by inverting the receptacle together with the container, the receptacle may be finally withdrawn and leave the fruit in the container in a neatly arranged manner.

From the above it will be seen that I have produced a new and novel piece of apparatus by means of which a considerable saving may be effected in the canning of sliced pineapple and the like, and, while I have described my invention in connection with a preferred embodiment thereof, I desire to have it understood that many modifications and variations therefrom may be made by those skilled in the art without departing from the spirit and scope of my invention as defined in the appended claims.

Having thus described my invention, what I claim and desire to secure by Letters Patent is—

1. A canning appliance for recovering half slices of fruit and the like comprising a horizontally disposed receptacle adapted to receive the fruit in an edgewise position, a knife slidably mounted along the top of said receptacle adapted to be moved over the fruit and cut away the top portions thereof, a gate intermediate the ends of said receptacle adapted to hold the fruit during the cutting operation, and means at the end of said receptacle adapted to receive the remaining halves of fruit when said gate is opened and said fruit discharged from the receptacle.

2. A canning appliance for recovering half slices of fruit and the like comprising a horizontally disposed receptacle adapted to receive the fruit in an edgewise position, a knife slidably mounted upon the top edges of said receptacle and adapted to be moved over the fruit to cut away the top portions thereof, a gate intermediate the ends of said receptacle adapted to hold the fruit during the cutting operation, a support at the discharge end of said receptacle, and a receiver adapted to be held in said support and receive the lower halves of the fruit when said gate is opened and the fruit discharged from the receptacle.

3. In a canning appliance for recovering half slices of fruit and the like, the combination of a horizontally disposed receptacle adapted to receive the sliced fruit in an edgewise position, a knife for cutting away the upper halves of said sliced fruit, a portable receiver mounted upon the end of said receptacle adapted to receive the remaining halves of said fruit, said receptacle having a diametrically extending partition below which the halves of fruit are placed, and means whereby the receptacle may be rotated to place the remaining half thereof in a position to receive a further supply of half slices.

4. In a canning appliance for recovering half slices of fruit and the like, the combination of a horizontally disposed receptacle adapted to receive the sliced fruit in an edgewise position, a knife for cutting away the upper halves of said sliced fruit, a portable receiver mounted upon the end of said receptacle adapted to receive the lower halves of said fruit, said receptacle having a diametrically extending partition below which the halves of fruit are placed, means whereby the receptacle may be rotated to place the remaining half thereof in a position to receive a further supply of half slices, and stops cooperating with said receiver for aligning the diametrically extending partition in a horizontal position.

5. A canning appliance for the recovery of half slices of damaged fruit and the like, comprising a receptacle adapted to receive the fruit in an edgewise position with the damaged portions projecting therefrom, a knife slidably mounted upon said receptacle and adapted to be moved over the fruit and cut away the damaged portions thereof, means for holding the fruit while the knife is operating to cut away the damaged portions, and means at the end of said receptacle adapted to receive the undamaged halves of said fruit when said holding means is rendered inoperative to permit the discharge of said fruit from said receptacle.

OWEN T. DOUGLASS.